(12) United States Patent
McClure (10) Patent No.: US 11,576,309 B2
(45) Date of Patent: Feb. 14, 2023

(54) SYSTEM AND METHOD FOR CLEANING A CUTTING ASSEMBLY OF AN AGRICULTURAL BALER

(71) Applicant: CNH Industrial America LLC, New Holland, PA (US)

(72) Inventor: John R. McClure, New Holland, PA (US)

(73) Assignee: CNH Industrial America LLC, New Holland, PA (US)

( * ) Notice: Subject to any disclaimer, the term of this patent is extended or adjusted under 35 U.S.C. 154(b) by 366 days.

(21) Appl. No.: 16/803,113

(22) Filed: Feb. 27, 2020

(65) Prior Publication Data
US 2021/0267129 A1 Sep. 2, 2021

(51) Int. Cl.
| | |
|---|---|
| *A01F 15/10* | (2006.01) |
| *A01F 29/09* | (2010.01) |
| *A01F 29/08* | (2006.01) |
| *A01F 17/02* | (2006.01) |
| *B65G 19/04* | (2006.01) |
| *B65G 41/00* | (2006.01) |

(Continued)

(52) U.S. Cl.
CPC ............ *A01F 15/10* (2013.01); *A01F 29/08* (2013.01); *A01F 29/09* (2013.01); *A01D 78/04* (2013.01); *A01D 87/0007* (2013.01); *A01F 15/106* (2013.01); *A01F 17/02* (2013.01); *A01F 2015/107* (2013.01); *B65G 19/04* (2013.01); *B65G 41/002* (2013.01)

(58) Field of Classification Search
CPC .......... A01F 15/10; A01F 29/08; A01F 29/09; A01F 2015/107; A01F 17/02; A01F 15/106; B65G 19/04; B65G 41/002; A01D 87/0007; A01D 78/04
See application file for complete search history.

(56) References Cited

U.S. PATENT DOCUMENTS

| | | |
|---|---|---|
| 2,196,645 A | 4/1940 | Saiberlich |
| 4,604,858 A | 8/1986 | Esau et al. |
| 4,829,756 A | 5/1989 | Schrag et al. |

(Continued)

FOREIGN PATENT DOCUMENTS

| | | |
|---|---|---|
| DE | 10 2005 040 711 A1 | 3/2006 |
| DE | 10 2005 050 172 A1 | 5/2007 |

(Continued)

*Primary Examiner* — Arpad F Kovacs
*Assistant Examiner* — Arpad Fabian-Kovacs
(74) *Attorney, Agent, or Firm* — Peter Zacharias; Patrick Sheldrake (57) ABSTRACT

A method for operating a baler including an initial step of providing a cleaning system that includes a floor plate having a plurality of slots therein, at least one knife tray, at least one actuator operably connected to the at least one knife tray, and a controller operably connected to the at least one actuator. The method further includes the steps of determining whether the plurality of knives of the at least one knife tray is retracted, determining whether to conduct a knife tray cleanout procedure for cleaning the floor plate based upon at least one cleaning parameter, and conducting the knife tray cleanout procedure by actuating the at least one actuator for cycling the plurality of knives of the at least one knife tray for dislodging debris from the floor plate.

18 Claims, 4 Drawing Sheets

(51) Int. Cl.
  *A01D 87/00* (2006.01)
  *A01D 78/04* (2006.01)

(56) References Cited

U.S. PATENT DOCUMENTS

| | | | | |
|---|---|---|---|---|
| 5,819,517 | A * | 10/1998 | Amanatidis | A01D 90/04 198/723 |
| 5,974,776 | A * | 11/1999 | Prellwitz | A01D 90/04 56/504 |
| 6,301,869 | B1 | 10/2001 | Schmitcke | |
| 6,912,835 | B1 * | 7/2005 | Chabassier | A01F 15/10 241/243 |
| 7,677,965 | B2 | 3/2010 | Farley et al. | |
| 9,468,149 | B2 * | 10/2016 | Derscheid | A01F 29/04 |
| 9,526,214 | B2 * | 12/2016 | McClure | A01D 90/04 |
| 9,549,506 | B2 * | 1/2017 | McClure | A01F 15/08 |
| 9,713,306 | B2 * | 7/2017 | Singh | F15B 21/08 |
| 10,588,272 | B2 * | 3/2020 | Devroe | A01F 15/101 |
| 11,191,216 | B2 * | 12/2021 | McHale | B65G 19/04 |
| 2008/0028738 | A1 * | 2/2008 | Viaud | A01F 15/106 56/341 |
| 2013/0167498 | A1 * | 7/2013 | Haycocks | A01F 15/08 56/341 |
| 2018/0027742 | A1 * | 2/2018 | Schinstock | A01F 15/10 |

FOREIGN PATENT DOCUMENTS

| | | | | |
|---|---|---|---|---|
| EP | 3050426 | A1 * | 8/2016 | A01D 90/04 |
| EP | 3141106 | A1 * | 3/2017 | A01F 15/07 |
| EP | 3864952 | A1 * | 8/2021 | A01D 75/182 |

\* cited by examiner

SYSTEM AND METHOD FOR CLEANING A CUTTING ASSEMBLY OF AN AGRICULTURAL BALER

BACKGROUND OF THE INVENTION

The present invention pertains to agricultural balers and, more specifically, to a system and method for automatically cleaning a knife tray of an agricultural baler.

Agricultural harvesting machines, such as balers, are used to consolidate and package crop material so as to facilitate the storage and handling of the crop material for later use. In the case of hay or silage, a mower-conditioner is typically used to cut and condition the crop material. In the case of straw, an agricultural combine discharges non-grain crop material from the rear of the combine defining the straw which is to be picked up by the baler. The cut crop material is typically raked into a windrow, and a baler, such as a large square baler or round baler, straddles the windrows and travels along the windrows to pick up the crop material and form it into bales.

A round baler may generally include a frame, supported by wheels, a hydraulic system, a pickup unit to engage and lift the crop material into the baler, a cutting assembly, a main bale chamber for forming a bale, and a wrapping mechanism for wrapping or tying a material around the bale after it has been formed in the main bale chamber. As the baler is towed over a windrow, the pickup unit lifts the crop material into the baler. Then, the crop material may be cut into smaller pieces by the cutting assembly. As the crop material enters the main bale chamber, multiple carrier elements, e.g. rollers, chains and slats, and/or belts, will begin to roll a bale of hay within the chamber. These carrier elements are movable so that the chamber can initially contract and subsequently expand to maintain an appropriate amount of pressure on the periphery of the bale. After the bale is formed and wrapped by the wrapping mechanism, the rear of the baler is configured to open for allowing the bale to be discharged onto the field.

The cutting assembly typically includes a conveyor, e.g. a rotor with blades, a juxtaposed floor plate with multiple slots therein, and one or more knife trays with knives that selectively extend through the slots in the floor plate for cutting the crop material in cooperation with the rotor blades. To achieve a desired cutting profile, the knives can be extended or retracted as desired via hydraulic cylinders which are operably connected to the knife trays. During operation of the baler with the knife trays in their retracted position, wherein the slots are open, unwanted material, such as debris, can accumulate on the floor plate or within the knife trays themselves. This buildup of debris may hinder the operation of the baler because the debris may prevent the movement of the knife trays and bend or otherwise damage the knives of the knife trays. Thereby, to prevent the buildup of debris, the operator must generally manually insert knife blanks to close off the slots in the floor plate and cleanout the area around the floor plate. As can be appreciated, it may be tiresome and inefficient for the operator to manually cleanout the cutting assembly.

What is needed in the art is an efficient system and method for cleaning the cutting assembly of an agricultural baler.

SUMMARY OF THE INVENTION

In one exemplary embodiment formed in accordance with the present invention, there is provided a cleaning system and method for cleaning the rotor floor of the baler. The cleaning system periodically determines whether one or more of the knife trays are retracted, determines whether to conduct a knife tray cleanout procedure based upon at least one cleaning parameter, and conducting the knife tray cleanout procedure. The cleaning system performs the knife tray cleanout procedure by cycling the knives of one or more of the knife trays in order to dislodge debris from the floor plate.

In another exemplary embodiment formed in accordance with the present invention, there is provided a method for operating a baler. The method includes an initial step of providing a cleaning system that includes a floor plate having a plurality of slots therein, at least one knife tray with a plurality of knives, at least one actuator operably connected to the at least one knife tray, and a controller operably connected to the at least one actuator. The controller is configured for actuating the at least one actuator for moving the at least one knife tray for inserting and retracting the plurality of knives into and out of the plurality of slots of the floor plate. The method further includes the steps of determining, by the controller, whether the plurality of knives of the at least one knife tray is retracted, determining, by the controller, whether to conduct a knife tray cleanout procedure for cleaning the floor plate based upon at least one cleaning parameter, and conducting, by the controller, the knife tray cleanout procedure by actuating the at least one actuator for cycling the plurality of knives of the at least one knife tray for dislodging debris from the floor plate.

In yet another exemplary embodiment formed in accordance with the present invention, there is provided an agricultural baler for baling crop material in a field. The baler includes a frame, a rotor rotatably connected to the frame and comprising a plurality of blades, and a cleaning system. The cleaning system includes a floor plate disposed adjacent to the rotor and having a plurality of slots therein, at least one knife tray disposed adjacent to the floor plate, the at least one knife tray having a plurality of knives, and each knife of the plurality of knives being associated with a respective slot of the plurality of slots, and at least one actuator operably connected to the at least one knife tray. The agricultural baler further includes a controller operably connected to the at least one knife tray and configured for actuating the at least one actuator for moving the at least one knife tray for inserting and retracting the plurality of knives into and out of the plurality of slots of the floor plate. The controller is further configured for determining whether the plurality of knives of the at least one knife tray is retracted, determining whether to conduct a knife tray cleanout procedure for cleaning the floor plate based upon at least one cleaning parameter, and conducting the knife tray cleanout procedure by actuating the at least one actuator for cycling the plurality of knives of the at least one knife tray for dislodging debris from the floor plate.

One possible advantage of the exemplary embodiment of the agricultural baler is that the cleaning system increases the efficiency of baling because the operator no longer needs to manually cleanout out the knife trays since the cleaning system automatically conducts a knife tray cleanout procedure.

Another possible advantage of the exemplary embodiment of the agricultural baler is that the operator no longer needs to manually insert dummy knives or knife blanks into the knife trays.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "forward", "rearward", "left" and "right", when used in connection with the agricultural baler and/or components thereof are usually determined with reference to the direction of forward operative travel of the towing vehicle, but they should not be construed as limiting. The terms "longitudinal" and "transverse" are determined with reference to the fore-and-aft direction of the towing vehicle and are equally not to be construed as limiting.

Figure 1:
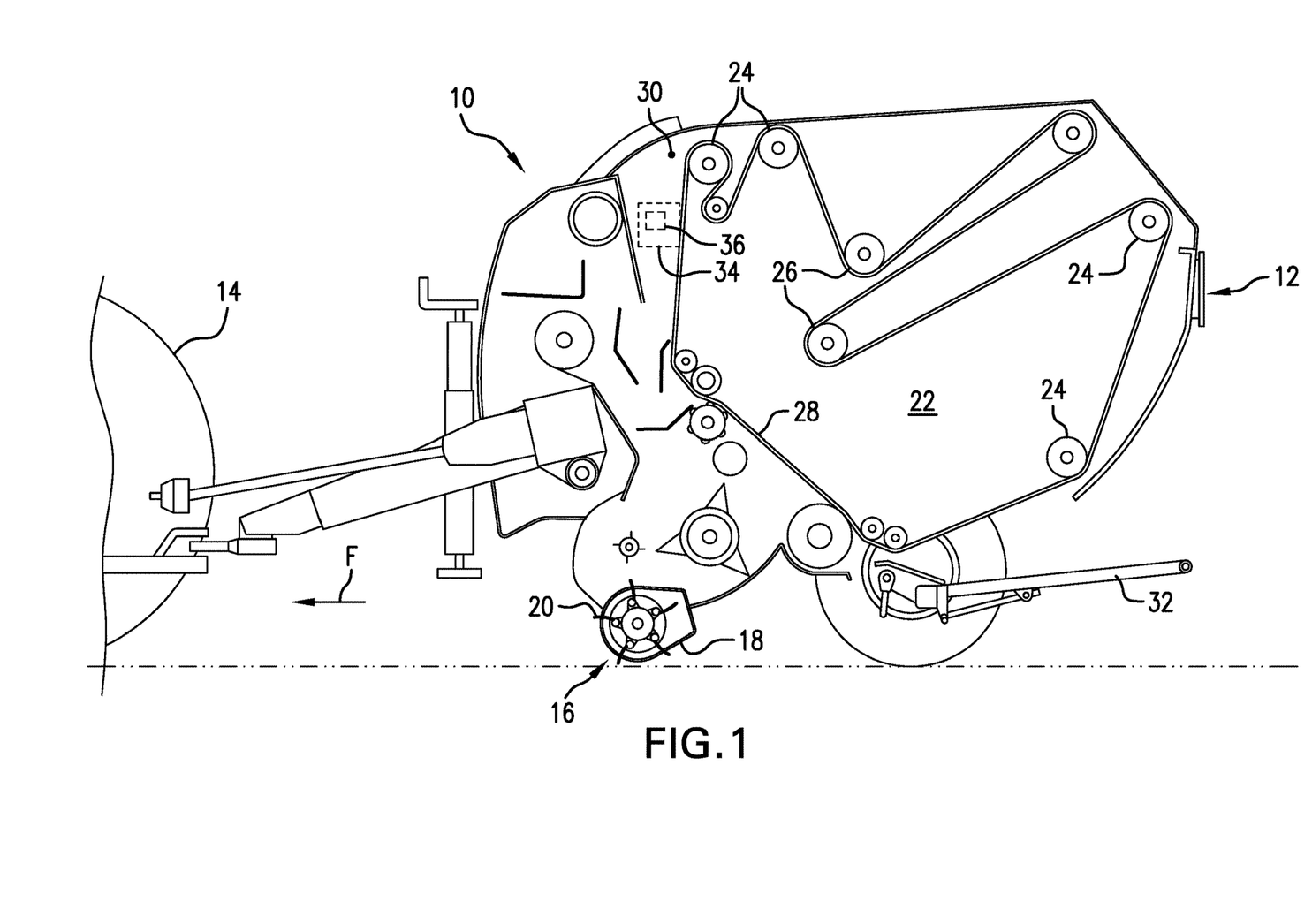
FIG. 1 illustrates a side cross-sectional view of an agricultural round baler, in accordance with an exemplary embodiment of the present invention.

Referring now to the drawings, and more particularly to FIG. 1, there is shown a cross-sectional, side view of a round baler 10 which may be towed by a vehicle 14 in a forward direction of travel F. The vehicle 14 may be any desired vehicle, such as an agricultural vehicle in the form of a tractor 14. It should be appreciated that while the baler 10 is illustrated and described as a round baler 10, in some embodiments the baler 10 can be configured as a square baler.

Crop material is lifted from windrows into the baler 10 by a pickup unit 16. The pickup unit 16 includes a rotating pickup reel 18 with tine bars and tines 20, which move the crop rearward toward a variable bale chamber 22. The reel 18 is rotatable in an operating direction for lifting the crop material off of the ground and a reverse direction, i.e., opposite to the operating direction.

The bale chamber 22 is configured as a variable bale chamber 22 which includes multiple rolls or rollers 24, 26, such as various stationary rollers 24 and movable rollers 26, actuators and pivot arms coupled to the movable rollers 26, and at least one belt 28. The rollers 24, 26 may comprise a floor roller, starter roller, fixed roller(s), pivot roller(s), stripper roller, and/or follower roller(s). Together, the rollers 24, 26 and the belt(s) 28 create a round circulating chamber which expands in between an empty bale position and a full bale position for engaging and rolling the bale. As the bale grows inside the chamber 22 it begins to act upon the belts 28 such that the belts 28 pull against the pivot arms which in turn causes the movable rollers 26 to move upwardly so that the variable bale chamber 22 incrementally expands with the size of the bale.

When the bale reaches a predetermined size, the bale is wrapped with a wrapping material (e.g., mesh or twine) by a wrapper. Then, once fully wrapped, the bale is ejected out of the tail gate 12. The tail gate 12 may pivot upwardly about pivot axis 30 to open the bale chamber 22. Then, the bale rolls out of the bale chamber 22 and onto a bale ejector or kicker 32, which pushes the bale rearwardly away from the baler 10 so that the tail gate 12 may downwardly pivot unencumbered by the ejected bale.

The baler 10 can further include an electrical processing circuit 34, e.g. a controller 34 with a memory 36, for conducting various baling procedures or operations. For instance, the controller 34 can be configured for carrying out the bale discharge operation. Hence, the controller 34 may open the tail gate 12 via accompanying actuators upon sensing a full bale condition by a bale-size sensor (not shown). It should be appreciated that the controller 34 may be incorporated as part of the baler 10 and/or tractor 14.

Figure 2:
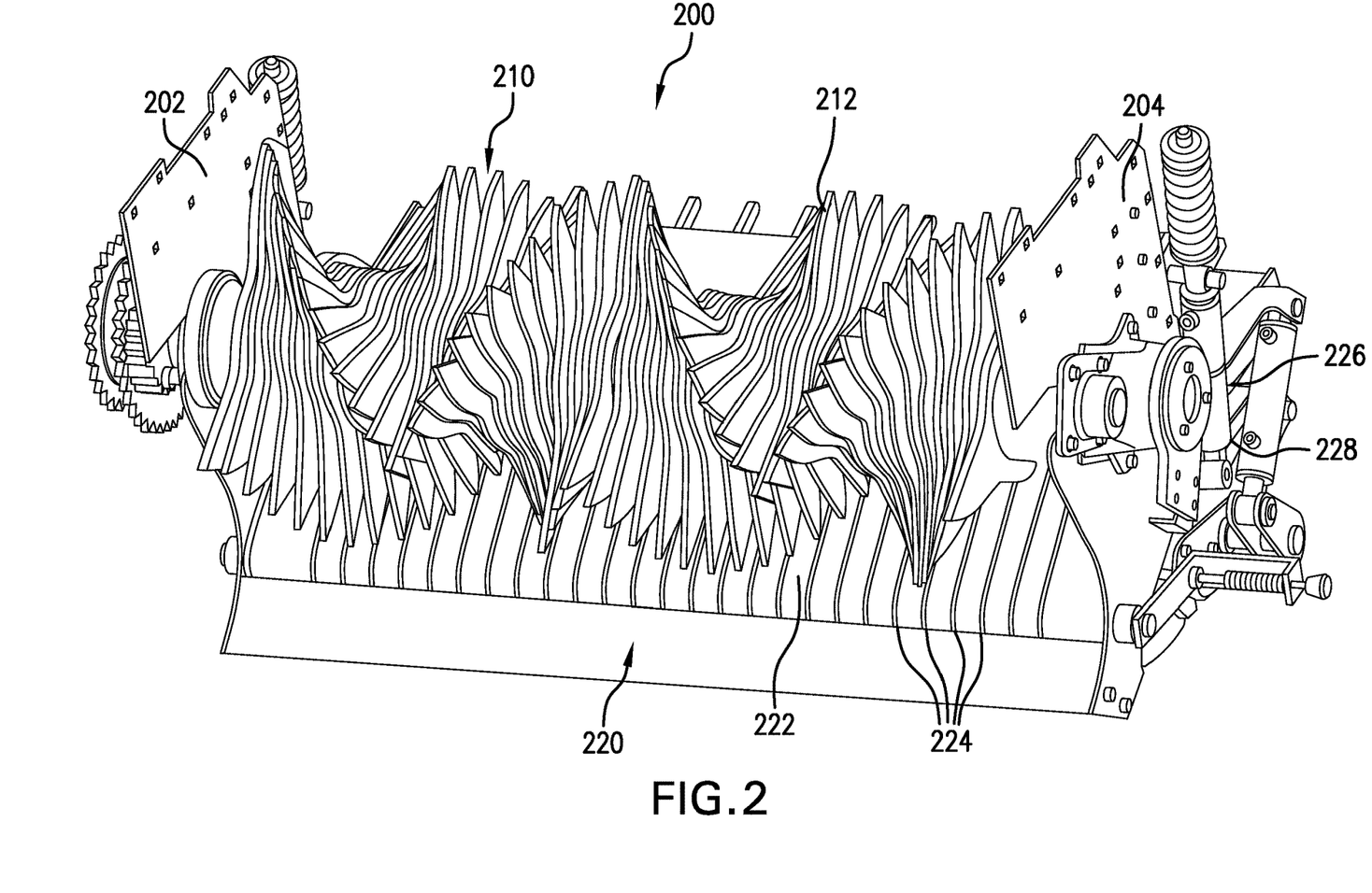
FIG. 2 illustrates a perspective view of the cutting assembly of the baler of FIG. 1.
Figure 3:
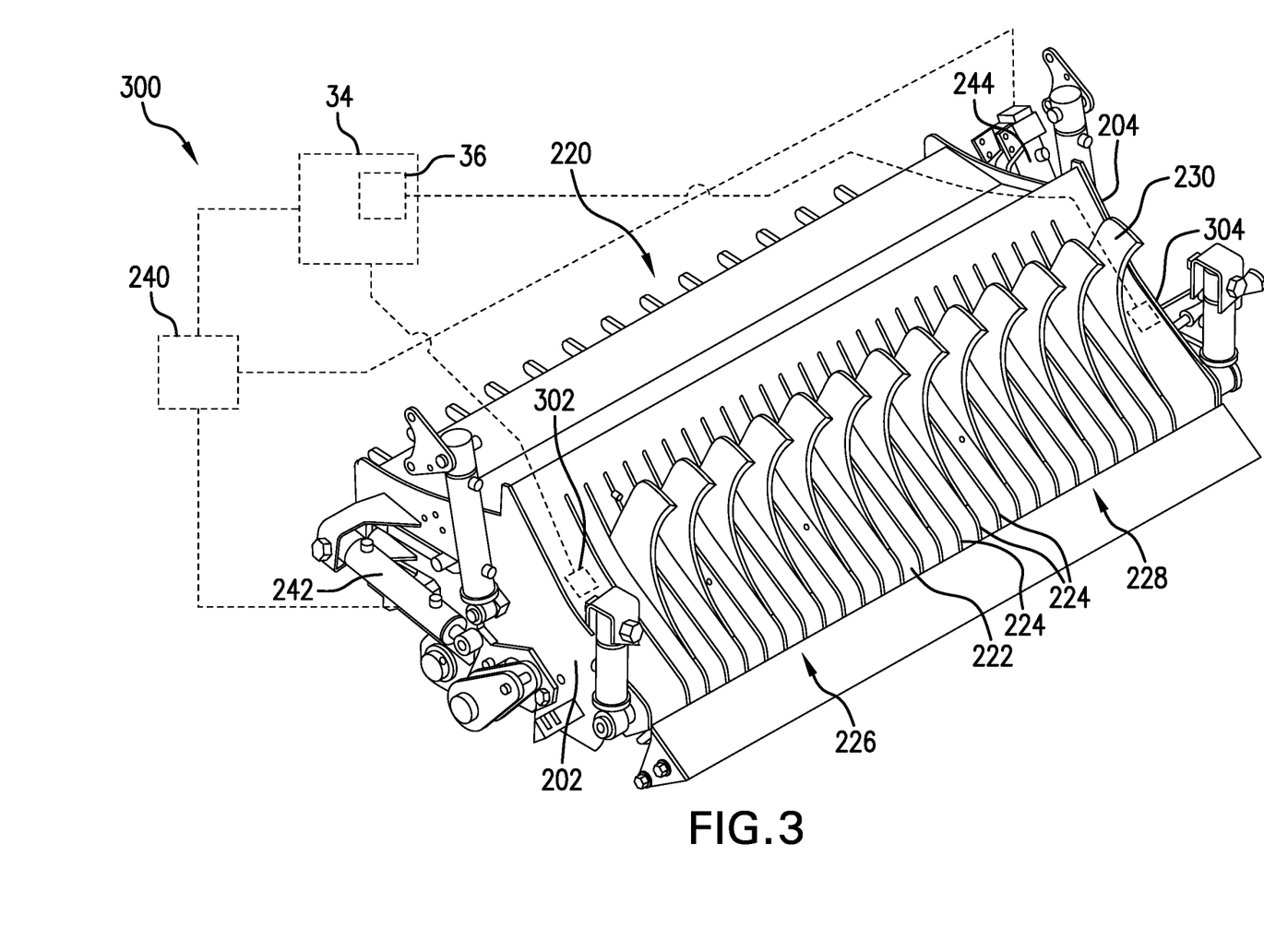
FIG. 3 illustrates a perspective view of the floor assembly of the baler of FIGS. 1-2.

Referring now collectively to FIGS. 1-3, there is shown a perspective view of a feeder or cutting assembly 200 which is located rearwardly and downstream of the pickup unit 16 and upstream of the bale chamber 22. The cutting assembly 200 generally includes sidewalls 202, 204, a rotor 210 with blades 212, and a rotor floor assembly 220 disposed adjacent to the rotor 210. The rotor floor assembly 220 includes a floor plate 222, with slots therein 224, and one or more knife trays 226, 228 with corresponding sets of knives 230 that may be positioned into and out of the slots 224 of the floor plate 222. The knife trays 226, 228 can be located underneath the floor plate 222 and may include any desired number of knives 230, such as twenty-six total knives, arranged in two sets of thirteen knives 230. Each knife tray 226, 228 is pivotally coupled to the sidewalls 202, 204 via a respective transverse member, e.g. rod (unnumbered). Each knife tray 226, 228 is movable by the controller 34 which selectively energizes one or more solenoid valves within a hydraulic manifold 240 for accordingly extending and retracting a respective actuator such as a hydraulic cylinder 242, 244 that is coupled to the respective transverse member (FIG. 3). Then, the first and second hydraulic cylinders 242, 244 independently move the first and second knife trays 226, 228 such that the knives 230 thereof are correspondingly moved from an extended cutting position to a retracted non-cutting position. Hence, the knives 230 can be extended or retracted via moving the knife tray(s) 226, 228 through the respective hydraulic cylinder(s) 242, 244. As can be appreciated, the first and second knife trays 226, 228 can be selectively inserted or retracted to achieve a desired cutting profile. For instance, as shown in FIG. 3, one knife tray 228 has its knives 230 extended and the other knife tray 226 has its knives 230 retracted. During operation of the baler 10 when the knives 230 are retracted, unwanted material such as debris, dust, or any other object, may undesirably accumulate on the floor plate 222 and/or within the slots 224, which may prevent the knives 230 from extending into their cutting position. For example, the debris can become compacted such that movement of the knives 230 against the compacted debris results in deflection of the knives 230. The deflection may be to such a degree that some of the knives 230 are entirely prevented from moving. In extreme cases, the knives 230 may deflect so much that the knives 230 are permanently damaged. To fix the issue, an operator generally needs to clean out the accumulated debris from the floor plate 222 and/or insert knife blanks into the slots 224 when the knife tray 226, 228 is retracted. As can be appreciated, manually cleaning out the floor plate 222 and/or the knife trays 226, 228 can be inconvenient and time consuming.

Referring now specifically to FIG. 3, the baler 10 may additionally include an automated cleaning system 300 for automatically cleaning the debris from the floor plate 222 by conducting a knife tray cleanout procedure. The cleaning system 300 may collectively comprise the controller 34, the rotor floor assembly 220, the hydraulic manifold 240, and at least one hydraulic cylinder 242, 244 for moving at least one knife tray 226, 228 of the rotor floor assembly 220 in order to position the knives 230 of the at least one knife tray 226, 228 in between its extended and retracted positions. The cleaning system 300 may also include at least one sensor 302, 304 located on, underneath, or adjacent to the floor plate 222 for determining a level of debris associated with the floor plate 222, for example the debris which is presently accumulating on top of the floor plate 222, underneath the floor plate 222, and/or within the slots 224. The cleaning system 300 may periodically cycle the knives 230 in order to prevent the buildup of debris underneath or above the floor plate 222 and/or within the slots 224. For example, the knives 230 can be cycled by at least partially inserting the knives 230 into their respective slots 224 and retracting the knives 230 from their respective slots 224. It is noted that the controller 34 may determine whether the knives 230 of the knife tray(s) 226, 228 are retracted before accordingly conducting the knife tray cleanout procedure. For instance, the controller 34 may identify the position of the knife tray 226, 228 by tracking whether its corresponding solenoid valve within the hydraulic manifold 240 is energized. It should be understood that in the automatic knife tray cleanout procedure, the controller 34 may energize the solenoid valves within the hydraulic manifold 240 to accordingly actuate the cylinder 242, 244 of the first and/or second knife trays 226, 228 to move the knives 230 and accordingly dislodge and remove debris from the floor plate 222.

The cleaning system 300 may automatically clean the floor plate 222 based upon one or more cleaning parameters. As used herein, the term cleaning parameter may include any desired data and/or command. For example, the term cleaning parameter may include the type of baler 10, an inserted or retracted status of a particular knife tray 226, 228, i.e., whether the knives 230 of the knife tray 226, 228 are retracted out of the slots 224, the current baling procedure, e.g. baling, wrapping, ejecting the bale, etc., a duration of time spent baling or time from the last cleanout procedure of the floor plate 222, the GPS location of the baler 10, the sensed cleanliness state, i.e., debris level, of floor plate 222 by the at least one sensor 302, 304, and/or a manually inputted user command to cycle the knives 230. The cleaning system 300 may automatically cycle the knives 230 of one or both of the knife trays 226, 228 upon a cycling of the tail gate 12. As used herein, the phrases cycling of the tail gate 12 or tail gate cycle may refer a cycle of movement of the tail gate 12 wherein the tail gate 12 is moved from closed-to-open-to-closed. The automatic cleaning of the knife trays 226, 268 may occur at any desired number of cycles of the tail gate 12, such as every 1 to 15 tail gate cycles. The knives 230 may be cycled just after the tail gate 12 has closed and before the core start within the bale chamber 22. Additionally, for example, the knives 230 may be cycled during baling if the knives 230 of one or both of the knife trays 226, 228 are retracted, as discussed below in more detail with respect to FIG. 4. Furthermore, the knives 230 may be cycled just before wrapping of the bale. Additionally, for example, the knives 230 may be cycled when the sensor(s) 302, 304 indicate that the floor plate 222 has become dirty. The knives 230 can also be cycled upon a set time interval, such as every fifteen minutes spent baling. Additionally or alternatively, the operator of the tractor 14 may input a cleaning command into a user interface which accordingly instructs the controller 34 to cycle the knives 230. It should be appreciated, that the knives 230 may be cycled at any desired time, except during a wrapping procedure of the baler 10 wherein the bale is wrapped with netting or twine.

Figure 4:
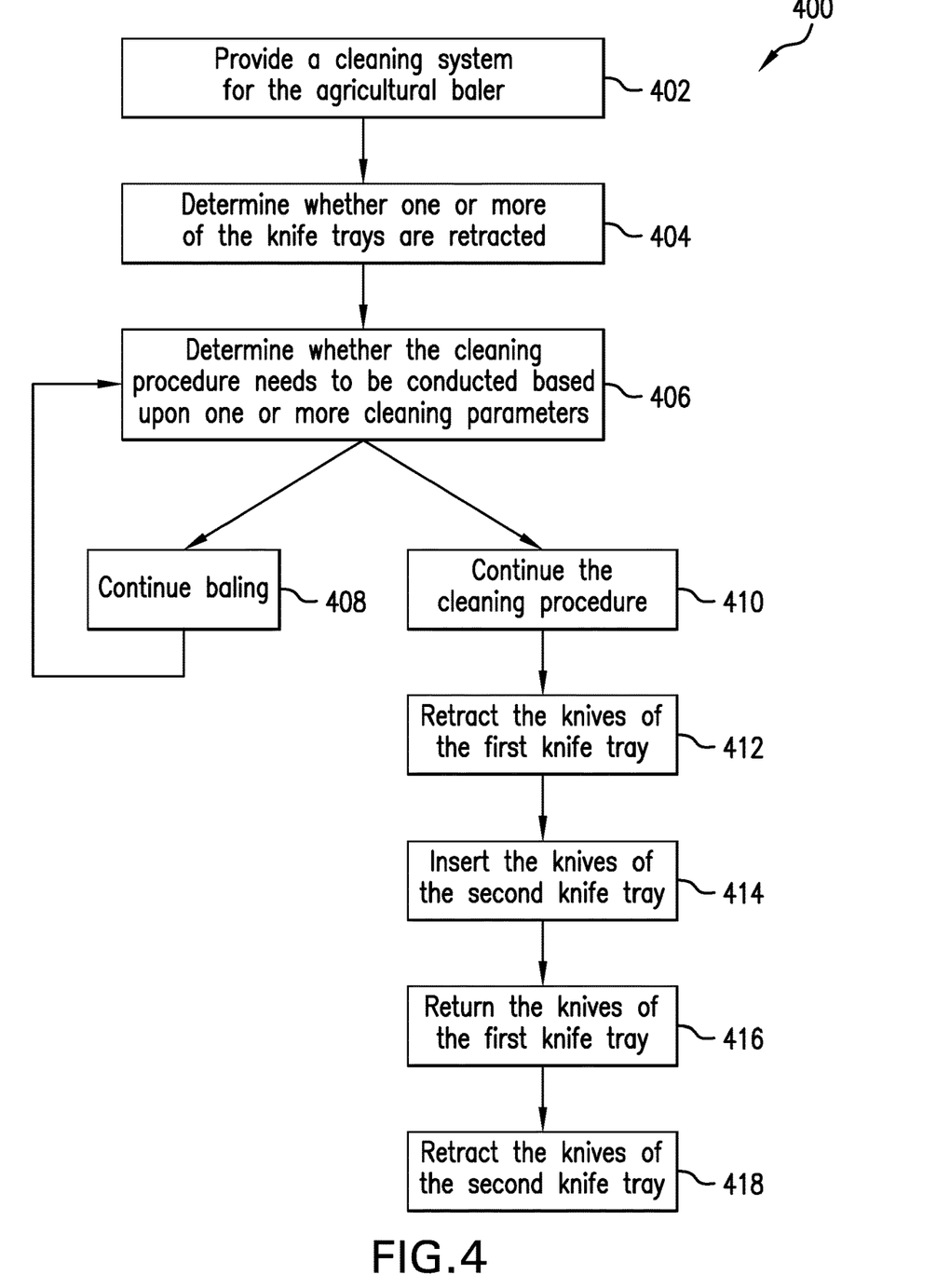
FIG. 4 illustrates a flow chart of a method for operating the baler, in accordance with an exemplary embodiment of the present invention.

Referring now to FIG. 4, there is shown a flow chart of an exemplary method 400 for operating the baler 10. The method 400 is an example of a cleaning procedure wherein the controller 34 automatically cleans the floor plate 222 during baling, i.e., forming of the bale within the bale chamber 22. The method 400 includes an initial step of providing a cleaning system 300, as discussed above (at block 402). The method 400 may then include determining, by the controller 34, whether the knives 230 of one or more of the knife trays 226, 228 are retracted (at block 404). For instance, the operator may select only the first knife tray 226 for cutting, and the controller 34 will register that the knives 230 of the second knife tray 228 are in their retracted, non-cutting position. Then, the controller 34 may determine if and when to conduct the cleaning procedure for cleaning the floor plate 222 based upon one or more cleaning parameters (at block 406). If the controller 34 determines that cleaning of the floor plate 222 does not need to occur, then the controller 34 will simply continue baling and loop back to determining whether the cleaning procedure should be conducted at a later time (at block 408). If, however, the controller 34 determines that the cleaning procedure should be conducted then the controller 34 may proceed with cleaning the floor plate 222 (at block 410). For example, the controller 34 may determine that the retracted knives 230 of the second knife tray 228 need be cleaned based upon a set time interval, the sensed level of debris accumulating on the floor plate 222, i.e., the cleanliness state of the floor plate 222, provided by the sensor(s) 302, 304, and/or a cycling of the tail gate 12. Thereafter, during baling, the controller 34 will conduct the cleaning procedure. For instance, the controller 34 may alternate the inserted or extended knives 230 of the first knife tray 226 with the retracted knives 230 of the second knife tray 228. The controller 34 may activate the corresponding solenoid valve to actuate the first cylinder 242 for moving the first knife tray 226 to accordingly retract its knives 230 (at block 412). Thereafter, the controller will activate the corresponding solenoid valve to actuate the second cylinder 244 for moving the second knife tray 228 to accordingly at least partially insert its knives 230 into the slots 224 (at block 414). Then, the controller 34 will return or reposition the knives 230 of the first knife tray 226 so that the first knife tray 226 resides in its previous inserted position for allowing its knives 230 to engage with the crop material (at block 416). The controller 34 will then reposition the second knife tray 228 in its original retracted position wherein its knives 230 are retracted (at block 418). It is noted that the alternate cycling of the knives of the first and second knife trays 226, 228 may occur in subsequent steps, one after the other, or simultaneously, with both cylinders 242, 244 acting at the same time.

It is to be understood that the method 400 and the operation of the cleaning system 300 may be performed by the controller 34 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 34 described herein is implemented in software code or instructions which are tangibly stored on a tangible computer readable medium. The controller 34 loads the software code or instructions via a direct interface with the computer readable medium or via a wired and/or wireless network. Upon loading and executing such software code or instructions by the controller 34, the controller 34 may perform the method 400 and any of the functionality of the controller 34 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

It should be appreciated that the hydraulic manifold 240 may be attached to the frame of the baler 10 and fluidly connected to the tractor 14. The hydraulic manifold 240 may or may not be the only manifold which hydraulically connects the baler 10 to the tractor 14. For example, the hydraulic manifold 240 can be a combination hydraulic manifold which combines and hydraulically connects a number of hydraulic lines of the various hydraulic subsystems of the baler 10 to the tractor 14. Alternatively, the hydraulic manifold 240 may be one of multiple hydraulic manifolds. The hydraulic manifold 240 may include variously configured valves, such as directional valves, solenoid valves, check valves, etc., filters, line restrictions, fluid lines, and ports. For instance, the hydraulic manifold 240 may include first and second knife tray solenoid valves that are operably connected to the first and second cylinders 242, 244, respectively. However, the hydraulic manifold 240 may include any desired combination of the solenoid valves to jointly or respectively accommodate one or more of the hydraulically operated subsystems of the baler 10. The controller 34 is operably connected to each solenoid valve in order to achieve one or more desired baler operations, such as moving the first and second knife trays 226, 228 to position the knives 230 thereof in the extended or retracted positions. As can be appreciated, the hydraulic cylinders 242, 244 may be in the form of any desired cylinders.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

The invention claimed is:

1. A method for operating a baler having a cleaning system comprising a floor plate having a plurality of slots therein, at least one knife tray comprising a plurality of knives, at least one actuator operably connected to the at least one knife tray, and a controller operably connected to the at least one actuator and configured for actuating the at least one actuator for moving the at least one knife tray for inserting and retracting the plurality of knives into and out of the plurality of slots of the floor plate, said method comprising the steps of:
determining, by the controller, whether the plurality of knives of the at least one knife tray is retracted;
determining, by the controller, whether to conduct a knife tray cleanout procedure for cleaning the floor plate based upon at least one cleaning parameter comprising one or more of a baling procedure, a duration of baling time, a duration of time from a prior knife tray cleanout procedure, a location of the baler, and an inputted user command; and
conducting, by the controller, the knife tray cleanout procedure by actuating the at least one actuator for cycling the plurality of knives of the at least one knife tray for dislodging debris from the floor plate.

2. The method of claim 1, wherein cycling the plurality of knives comprises at least partially inserting the plurality of knives into the plurality of slots and retracting the plurality of knives from the plurality of slots.

3. The method of claim 1, wherein the at least one cleaning parameter comprises a baling procedure of cycling the tail gate, and the controller determines whether to conduct the knife tray cleanout procedure based upon the baling procedure of cycling the tail gate.

4. The method of claim 1, wherein the at least one cleaning parameter comprises a baling procedure of forming a bale, and the controller determines whether to conduct knife tray cleanout procedure based upon the baling procedure of forming the bale and the duration of baling time.

5. The method of claim 4, wherein the at least one knife tray comprises a first knife tray comprising a first plurality of knives and a second knife tray comprising a second plurality of knives, and the at least one actuator comprises a first actuator and a second actuator respectively operably connected to the first knife tray and the second knife tray.

6. The method of claim 5, further comprising a step of conducting, by the controller, the baling procedure of forming the bale with the second plurality of knives of the second knife tray retracted.

7. The method of claim 6, wherein the step of conducting the knife tray cleanout procedure comprises alternating the first knife tray and the second knife tray by:
retracting the first plurality of knives of the first knife tray;
at least partially inserting the second plurality of knives of the second knife tray;
returning the first plurality of knives of the first knife tray; and
retracting the second plurality of knives of the second knife tray.

8. The method of claim 1, wherein the cleaning system further comprises at least one sensor located on the floor plate and configured for sensing a level of debris associated with the floor plate.

9. The method of claim 8, further comprising a step of sensing, by the at least one sensor, the level of debris associated with the floor plate, the at least one cleaning parameter further comprises a sensed level of debris provided by the at least one sensor, and the controller determines whether to conduct the knife tray cleanout procedure based upon the sensed level of debris.

10. An agricultural baler for baling crop material in a field, comprising:
a frame;
a rotor rotatably connected to the frame and comprising a plurality of blades;
a cleaning system, comprising:
a floor plate disposed adjacent to the rotor and comprising a plurality of slots therein;
at least one knife tray disposed adjacent to the floor plate, the at least one knife tray comprising a plurality of knives, and each knife of the plurality of knives being associated with a respective slot of the plurality of slots; and at least one actuator operably connected to the at least one knife tray; and a controller operably connected to the at least one knife tray and configured for actuating the at least one actuator for moving the at least one knife tray for inserting and retracting the plurality of knives into and out of the plurality of slots of the floor plate, and wherein the controller is further configured for determining whether the plurality of knives of the at least one knife tray is retracted, determining whether to conduct a knife tray cleanout procedure for cleaning the floor plate based upon at least one cleaning parameter comprising one or more of a baling procedure, a duration of baling time, a duration of time from a prior knife tray cleanout procedure, a location of the baler, and an inputted user command, and conducting the knife tray cleanout procedure by actuating the at least one actuator for cycling the plurality of knives of the at least one knife tray for dislodging debris from the floor plate.

11. The agricultural baler of claim 10, wherein cycling the plurality of knives comprises at least partially inserting the plurality of knives into the plurality of slots and retracting the plurality of knives from the plurality of slots.

12. The agricultural baler of claim 10, wherein the at least one cleaning parameter comprises a baling procedure of cycling the tail gate, and the controller determines whether to conduct the knife tray cleanout procedure based upon the baling procedure of cycling the tail gate.

13. The agricultural baler of claim 10, wherein the at least one cleaning parameter comprises a baling procedure of forming a bale, and the controller determines whether to conduct the knife tray cleanout procedure based upon the baling procedure of forming the bale and the duration of baling time.

14. The agricultural baler of claim 13, wherein the at least one knife tray comprises a first knife tray comprising a first plurality of knives and a second knife tray comprising a second plurality of knives, and the at least one actuator comprises a first actuator and a second actuator respectively operably connected to the first knife tray and the second knife tray.

15. The agricultural baler of claim 14, wherein the controller is further configured for conducting the baling procedure of forming the bale with the second plurality of knives of the second knife tray retracted.

16. The agricultural baler of claim 15, wherein the knife tray cleanout procedure comprises alternating the first knife tray and the second knife tray by:

retracting the first plurality of knives of the first knife tray;

at least partially inserting the second plurality of knives of the second knife tray;

returning the first plurality of knives of the first knife tray; and retracting the second plurality of knives of the second knife tray.

17. The agricultural baler of claim 10, wherein the cleaning system further comprises at least one sensor located on the floor plate and configured for sensing a level of debris associated with the floor plate.

18. The agricultural baler of claim 17, wherein the at least one cleaning parameter further comprises a sensed level of debris provided by the at least one sensor, and the controller determines whether to conduct the knife tray cleanout procedure based upon the sensed level of debris.

\* \* \* \* \*